US012585480B2

(12) United States Patent
Islas Bustamante et al.

(10) Patent No.: US 12,585,480 B2
(45) Date of Patent: Mar. 24, 2026

(54) USE OF GAZE TECHNOLOGY FOR HIGHLIGHTING AND SELECTING DIFFERENT ITEMS ON A VEHICLE DISPLAY

(71) Applicant: Atieva, Inc., Newark, CA (US)

(72) Inventors: Rodrigo Cardenas Islas Bustamante, Newark, CA (US); Sepehr Pourrezaei Khaligh, Newark, CA (US)

(73) Assignee: ATIEVA, INC., Newark, CA (US)

( * ) Notice: Subject to any disclaimer, the term of this patent is extended or adjusted under 35 U.S.C. 154(b) by 0 days.

(21) Appl. No.: 18/887,797

(22) Filed: Sep. 17, 2024

(65) Prior Publication Data

US 2025/0147645 A1    May 8, 2025

Related U.S. Application Data

(60) Provisional application No. 63/596,931, filed on Nov. 7, 2023.

(51) Int. Cl.
*G06F 9/451* (2018.01)
*B60K 35/22* (2024.01)
(Continued)

(52) U.S. Cl.
CPC .............. *G06F 9/451* (2018.02); *B60K 35/22* (2024.01); *B60K 35/26* (2024.01); *B60K 35/654* (2024.01);
(Continued)

(58) Field of Classification Search
CPC ...... G06F 9/451; G06F 3/013; G06F 3/04842; G06F 3/0487; G06F 3/04883;
(Continued)

(56) References Cited

U.S. PATENT DOCUMENTS

| | | | |
|---|---|---|---|
| 2005/0199783 A1* | 9/2005 | Wenstrand ............. | G06V 40/19 250/214.1 |
| 2015/0006278 A1* | 1/2015 | Di Censo ............. | G06V 20/597 705/14.43 |

(Continued)

OTHER PUBLICATIONS

International Search Report and Written Opinion received for PCT Patent Application No. PCT/US2024/054583, mailed on Dec. 23, 2024, 23 pages.

*Primary Examiner* — Douglas Wilson
(74) *Attorney, Agent, or Firm* — Womble Bond Dickinson (US) LLP

(57) ABSTRACT

This disclosure provides systems, apparatus, and methods, including computer programs encoded on storage media, for selecting and implementing automobile system function selectable by an eye gaze of a driver of a vehicle. In some implementations, the method can include receiving, via gaze sensors, gaze data indicative of the eye gaze of the driver of the vehicle. Additionally, the method can include determining, based on the gaze data, that the driver of the vehicle is looking at a selectable graphical user interface element (GUI). The method can additionally include capturing eyelid movement of the driver. The method can further include analyzing captured eyelid movement to determine whether to perform an automobile system function associated with the GUI element. The method can furthermore include performing the automobile system function associated with the GUI element upon determining that analysis of the captured eyelid movement indicates the automobile system function is to be performed.

18 Claims, 15 Drawing Sheets

700

Receive, via gaze sensors, gaze data indicative of the eye gaze of the driver of the vehicle
702

Determine, based on the gaze data, that the driver of the vehicle is looking at a selectable graphical user interface element (GUI)
704

Capture eyelid movement of the driver
706

Analyze captured eyelid movement to determine whether to perform an automobile system function associated with the GUI element
708

Perform the automobile system function associated with the GUI element upon determining that analysis of the captured eyelid movement indicates the automobile system function is to be performed
710

(51) Int. Cl.

| | |
|---|---|
| *B60K 35/26* | (2024.01) |
| *B60K 35/65* | (2024.01) |
| *G06F 3/01* | (2006.01) |
| *G06F 3/04842* | (2022.01) |
| *G06F 3/0487* | (2013.01) |
| *G06F 3/04883* | (2022.01) |
| *G06F 3/14* | (2006.01) |
| *G06V 40/18* | (2022.01) |

(52) U.S. Cl.
CPC .......... *G06F 3/013* (2013.01); *G06F 3/04842* (2013.01); *G06F 3/0487* (2013.01); *G06F 3/04883* (2013.01); *G06F 3/1423* (2013.01); *B60K 2360/191* (2024.01); *B60K 2360/21* (2024.01); *B60K 2360/349* (2024.01); *G06V 40/18* (2022.01)

(58) Field of Classification Search
CPC ......... G06F 3/1423; G06F 2203/04803; G06F 3/017; B60K 35/22; B60K 35/26; B60K 35/654; B60K 2360/191; B60K 2360/21; B60K 2360/349; B60K 2360/11; B60K 2360/146; B60K 2360/1464; B60K 35/28; B60K 2360/149; B60K 2360/182; B60K 35/10; B60K 35/29; B60K 35/60; B60K 35/81; G06V 40/18; G06V 20/597
See application file for complete search history.

(56) References Cited

U.S. PATENT DOCUMENTS

| | | |
|---|---|---|
| 2015/0015479 A1 | 1/2015 | Cho |
| 2017/0235363 A1 | 8/2017 | Breisinger et al. |
| 2019/0163268 A1* | 5/2019 | Shin ..................... H04N 13/271 |
| 2021/0232218 A1* | 7/2021 | Zucker .................. G06F 3/0304 |
| 2022/0413604 A1 | 12/2022 | Kim et al. |
| 2025/0110571 A1* | 4/2025 | Sorrentino, III ........ G06F 3/165 |
| 2025/0155972 A1* | 5/2025 | Guda Subhash ....... G06F 3/016 |

* cited by examiner

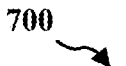

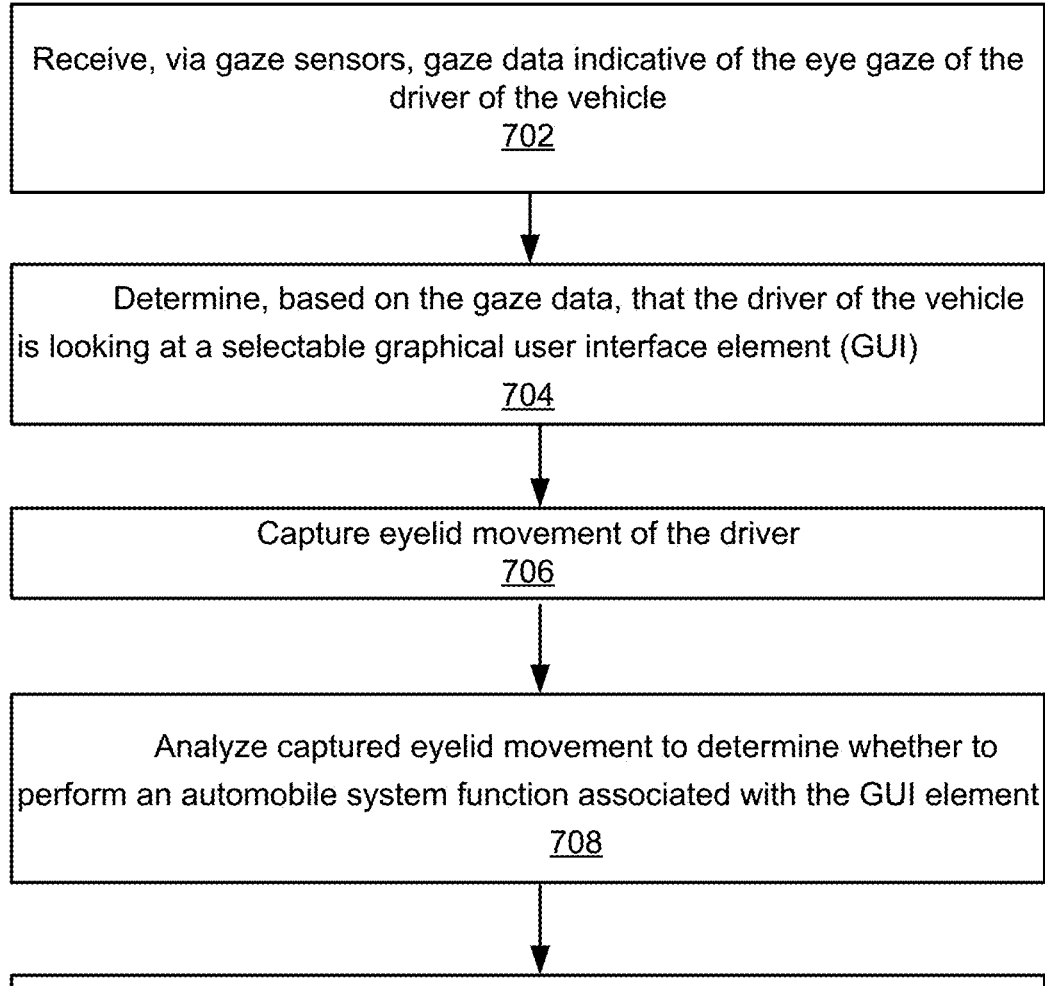

Receive, via gaze sensors, gaze data indicative of the eye gaze of the driver of the vehicle
702

Determine, based on the gaze data, that the driver of the vehicle is looking at a selectable graphical user interface element (GUI)
704

Capture eyelid movement of the driver
706

Analyze captured eyelid movement to determine whether to perform an automobile system function associated with the GUI element
708

Perform the automobile system function associated with the GUI element upon determining that analysis of the captured eyelid movement indicates the automobile system function is to be performed
710

FIG. 7

USE OF GAZE TECHNOLOGY FOR HIGHLIGHTING AND SELECTING DIFFERENT ITEMS ON A VEHICLE DISPLAY

CROSS-REFERENCE TO RELATED APPLICATIONS

This application claims the benefit of U.S. Provisional Patent Application No. 63/596,931, filed 7 Nov. 2023 the disclosure of which is incorporated herein by reference in its entirety.

TECHNICAL FIELD

The present disclosure relates generally to automobiles, and more particularly, to a method and apparatus for allowing a driver in the vehicle to select and implement an automobile system function using an eye gaze.

BACKGROUND

Operating a vehicle safely requires a driver's constant and focused attention. The complexities of navigating traffic, maintaining control of the vehicle, and anticipating potential hazards demand significant cognitive resources. The act of driving is increasingly challenged by the desire to perform additional tasks behind the wheel. In-car technology advancements, while offering convenience, often introduce distractions that can significantly hinder a driver's ability to perform these additional tasks. Simple actions like using a navigation system or selecting options from a complex menu can divert a driver's attention and cognitive focus from the primary task of maintaining safe operation of the vehicle. Accordingly, there is a need for automobile manufacturers to develop technologies that can minimize driver's distraction while seamlessly integrating these in-car technology advancements into an elevated driving experience.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In aspects of the disclosure, a method, a computer-readable medium, and an apparatus are provided. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some embodiments, a method can include receiving, via gaze sensors, gaze data indicative of the eye gaze of the driver of the vehicle and determining, based on the gaze data, that the driver of the vehicle is looking at a selectable GUI. The method can additionally include capturing eyelid movement of the driver and analyzing captured eyelid movement to determine whether to perform an automobile system function associated with the GUI element. The method can furthermore include performing the automobile system function associated with the GUI element upon determining that analysis of the captured eyelid movement indicates the automobile system function is to be performed.

Other embodiments of this aspect include corresponding computer systems, apparatus, and computer programs recorded on one or more computer storage devices, each configured to perform the actions of the methods.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DESCRIPTION OF THE DRAWINGS

The present invention is illustrated by way of example and not limitation in the figures of the accompanying drawings in which like references indicate similar elements.

FIG. 7 is a data flow diagram of a method of selecting and implementing an automobile system function selectable by an eye gaze of a driver of a vehicle in accordance with some embodiments.

DETAILED DESCRIPTION

Figure 1A:
FIG. 1A illustrates an example of gaze sensors (e.g., a driver monitoring camera and an occupant monitoring camera) utilized with the gaze detection system, in accordance with some embodiments.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" or "example" or "implementation" means that a particular feature, structure, or characteristic described in connection with the embodiment can be included in at least some embodiments of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure. The terms "electric vehicle" and "EV" may be used interchangeably and refer to an all-electric vehicle.

Controlling various functions of a vehicle often requires navigating complex menus or sub-menus through touch-screens, voice commands, and physical controls, leading to potential distractions and decreased driving focus. As an example of prior art implementations, the driver having to go back and forth between buttons, touch-screens and the steering wheel makes interactions unsafe. This prior art implementations are cumbersome and distracting.

Aspects of the present disclosure address the above-noted and other deficiencies by using gaze technology to select graphical user interface element (GUI) elements displayed on the infotainment screen of a vehicle; activate and deactivate currently selected GUI elements; and perform the automobile system function associated with the selected GUI element. Embodiments can enhance user driving experience and increase safety operations of the vehicle, by keeping the driver's hands on the wheel. Embodiments can be applied in various applications including triggering SOS calls during emergency or driver impairment, activating or de-activating surround view monitoring, controlling wiper setting, using parking application, and using navigation application, etc.

As will be described below, GUI elements of various frequently used applications (media, navigation, mobile phone, etc.) can be selected, using gaze technology, quickly and with very little effort, while the driver keeps their hand on the steering wheel. As will be described in detail, various feedback mechanisms can provide acknowledgement to the driver that their eye gaze is on the selectable GUI element.

FIGS. 1A-1D illustrate some embodiments of an automotive driver gaze detection system that can be integrated with or a component of an automotive single or multiple screen system. In some embodiments, automotive driver gaze detection system uses gaze technology to determine user input, interprets the gaze of a driver or occupant as direction to alter what is displayed on the graphical user interface (GUI) of the screen and initiate further action correspondingly. In some embodiments, automotive driver gaze detection system uses the outcome of user input determination from gaze detection to cause a portion of a display, or item being displayed thereon, to become highlighted (e.g., revealed (e.g., brightened, shown, etc.) if being looked at by the user or hidden (e.g., made less bright, etc.) if not being looked at any longer by the user). In some embodiments, a user input(s) determined through gaze detection could include, but are not limited to, swipe up, swipe down, swipe left, swipe right, touch select (e.g., through determination of gaze dwell time on a selector in the user interface), gaze directed to the upper screen, the lower screen, the front windshield of the vehicle (i.e., not gazing at the upper screen nor the lower screen), gaze directed to a left side mirror or a right side mirror, gaze directed to another region or component of a vehicle, driver inattention (e.g., staring too long, or eyes closed), and further gestures.

In some embodiments, a gaze processing module can receive, from gaze sensors, gaze data indicative of the eye gaze of the driver of the vehicle. In some embodiments, the gaze sensors can include a first camera and a second camera. As will be described in detail with reference to FIGS. 1A-1B, multiple cameras positioned in various locations within the vehicle can capture gaze data indicative of the eye gaze of the driver.

Figure 1B:
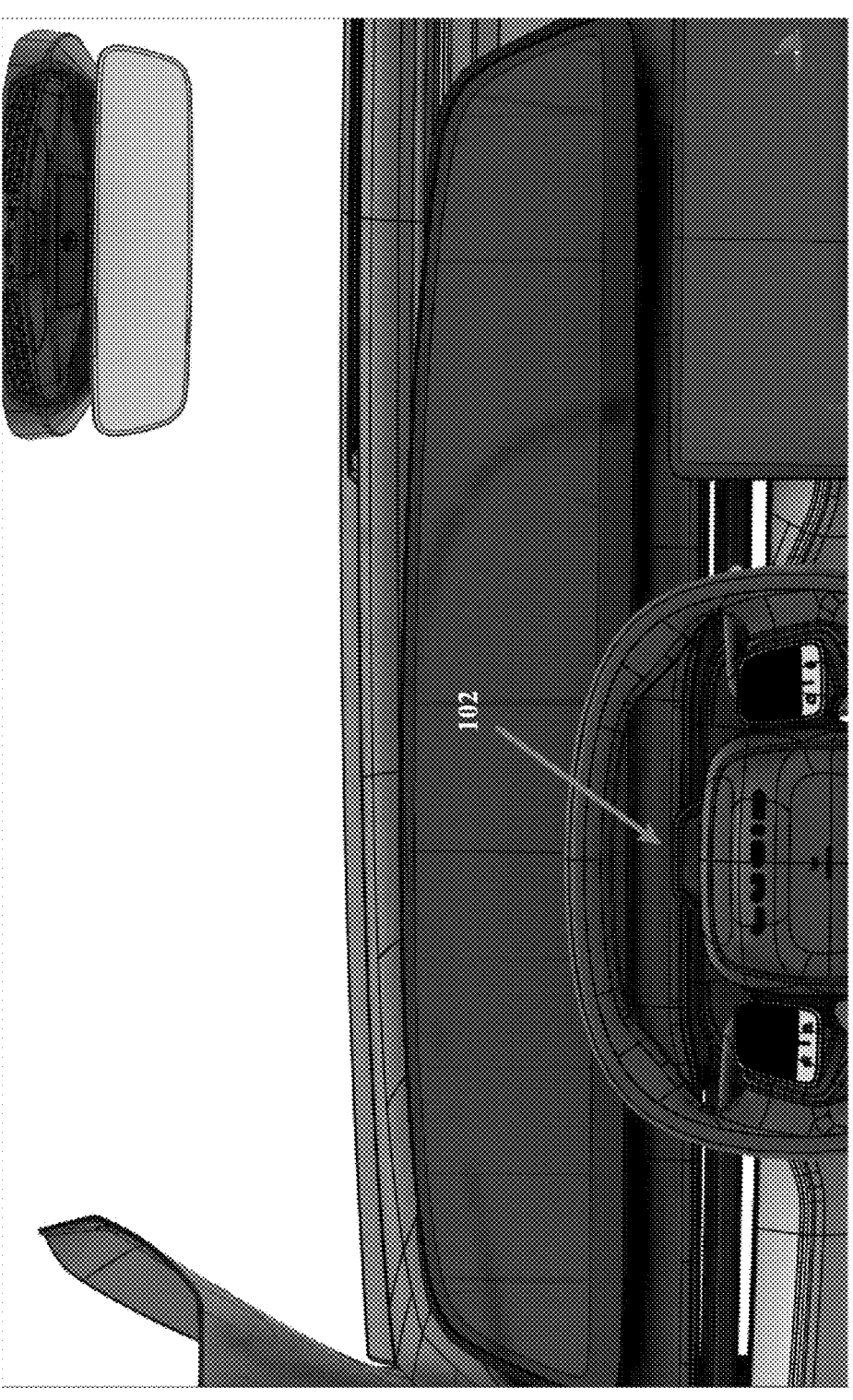
FIG. 1B, illustrates an example of a gaze sensor that can be integrated with the steering wheel column, in accordance with some embodiments.

FIG. 1A illustrates an example of gaze sensors (e.g., a driver monitoring camera and an occupant monitoring camera) utilized with the gaze detection system, in accordance with some embodiments. Referring to FIG. 1A, a gaze sensor, such as for example, a driver monitoring camera (DMC) 102, is mounted to a pillar 103 and directed to view a driver of a vehicle. Further placements could be devised in further embodiments. Another gaze sensor such as, for example, a driver and occupant monitoring camera (DOMC) 104, is mounted to an overhead console 105 and aimed to view a driver and occupant of a vehicle, i.e., occupants of front seats, and can also be aimed to view occupants of rear seats. With reference to FIG. 1B, DMC 102 can be integrated with the steering wheel column providing a clear view of driver's face and eyes. Further placements could be devised in further embodiments. It is understood the camera(s) are coupled to appropriate system component(s) to implement image capture or video capture and further processing (e.g., image processing, blink processing, etc.) for gaze detection (see, e.g., FIG. 7). Note that other sensors capable of determining an eye gaze (e.g., eye-tracking sensors, infra-red (IR) sensors, IR cameras, etc.,) can be used in conjunction with the system and method of the present disclosure.

Figure 1C:
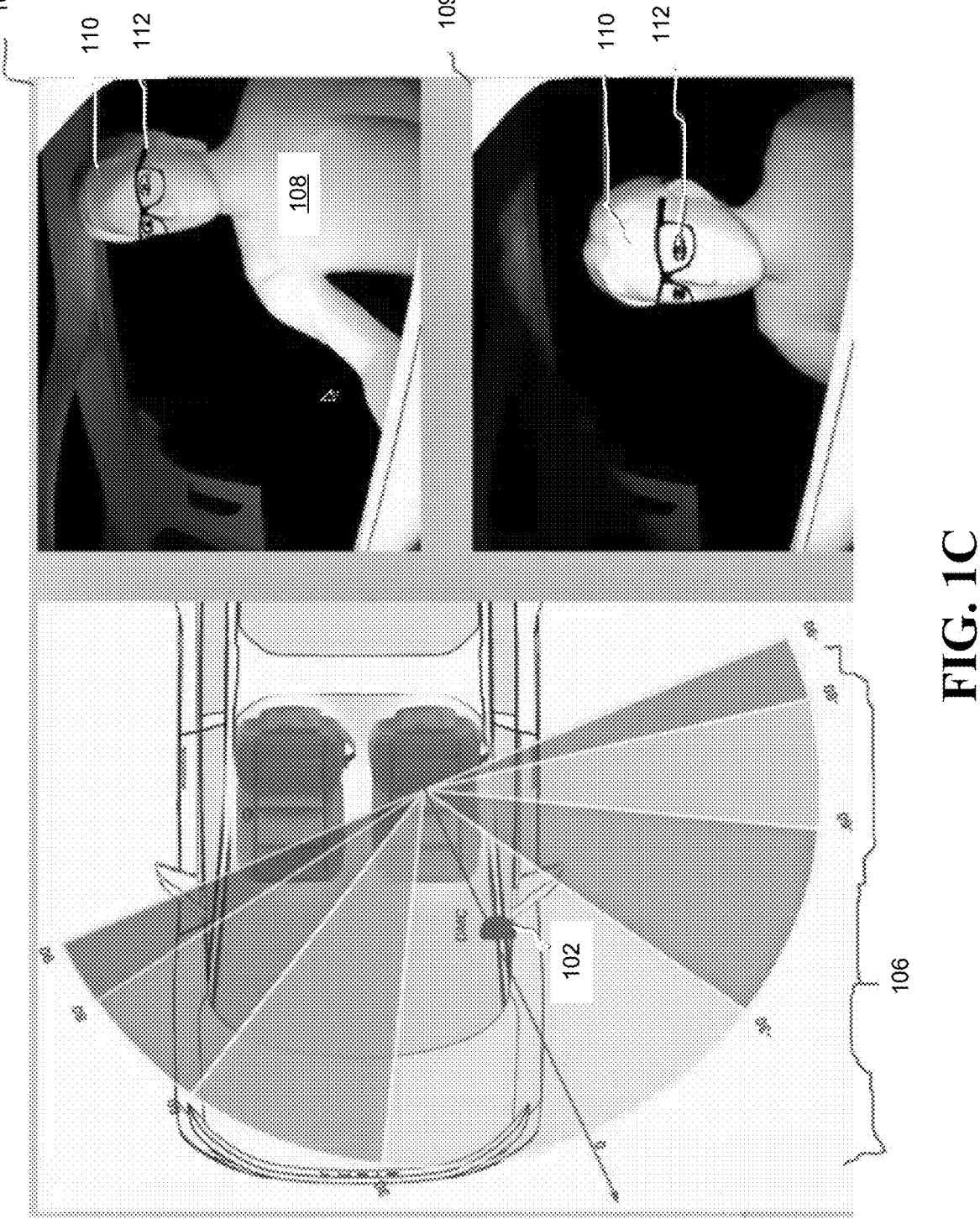
FIG. 1C, illustrates an example of angular ranges for gaze detection for determination of gaze of a driver, in accordance with some embodiments.

As will be described with reference to FIG. 1C, after receiving the gaze data, a gaze processing module can determine, based on the gaze data, that the driver of the vehicle is looking at a selectable GUI element (e.g., a button of a graphical representation of an application (e.g., a home card), etc.). FIG. 1C, illustrates an example of angular ranges for gaze detection for determining the direction of a driver's gaze, in accordance with some embodiments. Referring to FIG. 1C, a gaze processing module utilizes angular ranges 106 for gaze detection and captured images 107, 109 for determining the gaze direction of a driver. The gaze processing module can determine the gaze of the driver by monitoring head 110 and/or eyes 112 of a driver 108, as may be done by the DMC 102 and processing in the gaze detection system. For example, the gaze processing module can determine the gaze of the driver is directed to an angle or angular ranges 106 relative to the DMC 102. Here, shown are angular ranges 106 (e.g., horizontal angular ranges) and vertical angular ranges are readily understood as are other coordinate systems for gaze detection, in some embodiments.

In some embodiments, gaze detection is performed by monitoring the head 110 of the driver 108, determining orientation relative to the DMC 102. In some embodiments, gaze detection can be performed through monitoring the eyes 112 of the driver 108, determining orientation relative to the head 110 of the driver 108 and/or relative to the DMC 102. In some embodiments, gaze detection can be performed through determining the geometry and location information associated with the surface of the cornea of the driver of the vehicle. In some embodiments, gaze detection can be performed using triangulation of the location information associated with the sensors, driver's eyes and the infotainment system with respect to a local coordinate system.

In some embodiments, processing logic can highlight a GUI element at which the driver previously gazed. The gaze processing module can highlight the previously gazed location of the GUI element to refocus the eye gaze of the driver of the vehicle. For example, when a driver looks away from the screen to focus, for example, on the road, the gaze processing module can store the previously gazed GUI element to memorize the previously gazed GUI element. When the driver looks at the screen, the gaze processing module can highlight the previously gazed GUI element to remind the driver to what the driver the last or previous location at they were previously staring.

In some embodiments, the gaze processing module can capture eyelid movement of the driver. The gaze processing module can analyze captured eyelid movement to determine whether to perform an automobile system function associated with the GUI element at which the driver was gazing when the blinking occurred. The gaze processing module can perform the automobile system function associated with the GUI element upon determining that analysis of the captured eyelid movement indicates the automobile system function is to be performed.

In some embodiments, in analyzing the captured eyelid movement to determine whether to perform an automobile system function associated with the GUI element, the gaze processing module can analyze a blinking pattern of the driver. The gaze processing module can compare the blinking pattern of the driver with one or more predefined blinking patterns to determine the intent associated with the blinking pattern (e.g., whether the driver wants to engage a function, turn on a function, stop a function, pause a function, exit a function, switch a function, adjust a setting, modify an application, etc.).

Figure 1D:
FIG. 1D illustrates aspects of image processing and gaze determination as can be performed by the gaze detection system using images from the driver monitoring camera, in accordance with some embodiments.

FIG. 1D illustrates aspects of image processing and gaze determination as can be performed by the gaze processing module using images from the driver monitoring camera, in accordance with some embodiments. Referring to FIG. 1D, the gaze processing module can use gaze data (e.g., images) from the driver monitoring camera (e.g., DMC 102). On the left side of FIG. 1D, the gaze processing module can process an image of the head 110 (e.g., using machine vision processing) and outline and perform edge enhancement or edge determination (refer to contrast-enhanced white head outline on black background, outline of nose, lips, chin, or jaw line). The gaze processing module can further analyze these aspects so that the gaze processing module can determine the orientation head 110 orientation. On the right side of FIG. 1D, a gaze processing module can parameterize some facial features (e.g., using machine vision processing) and perform edge enhancement or edge determination (refer to the outline of upper and lower eyelids and iris), deduce eye pupil 115 and determine gaze direction 114, with these aspects visualized in a graphic overlay on the image of the head 110.

In some embodiments, a gaze processing module analyzes the gaze data using a machine learning (ML) model. For example, the gaze processing module can utilize an ML model such as a deep neural network (DNN) to analyze gaze data. Note that various ML models can be used to implement the embodiments and are not limited to a DNN. The gaze processing module can also implement ML module to analyze captured eyelid movement to determine whether to perform an automobile system function associated with the GUI element. The gaze processing module can train the ML model using gaze data including image captured by the gaze sensors, as described above. The gaze processing module can use the ML model to compare the blinking pattern of the driver with one or more predefined blinking patterns. The comparison can be used to indicate whether the driver wants a function (e.g., an operation of an application, etc.) to be performed.

Figure 2:
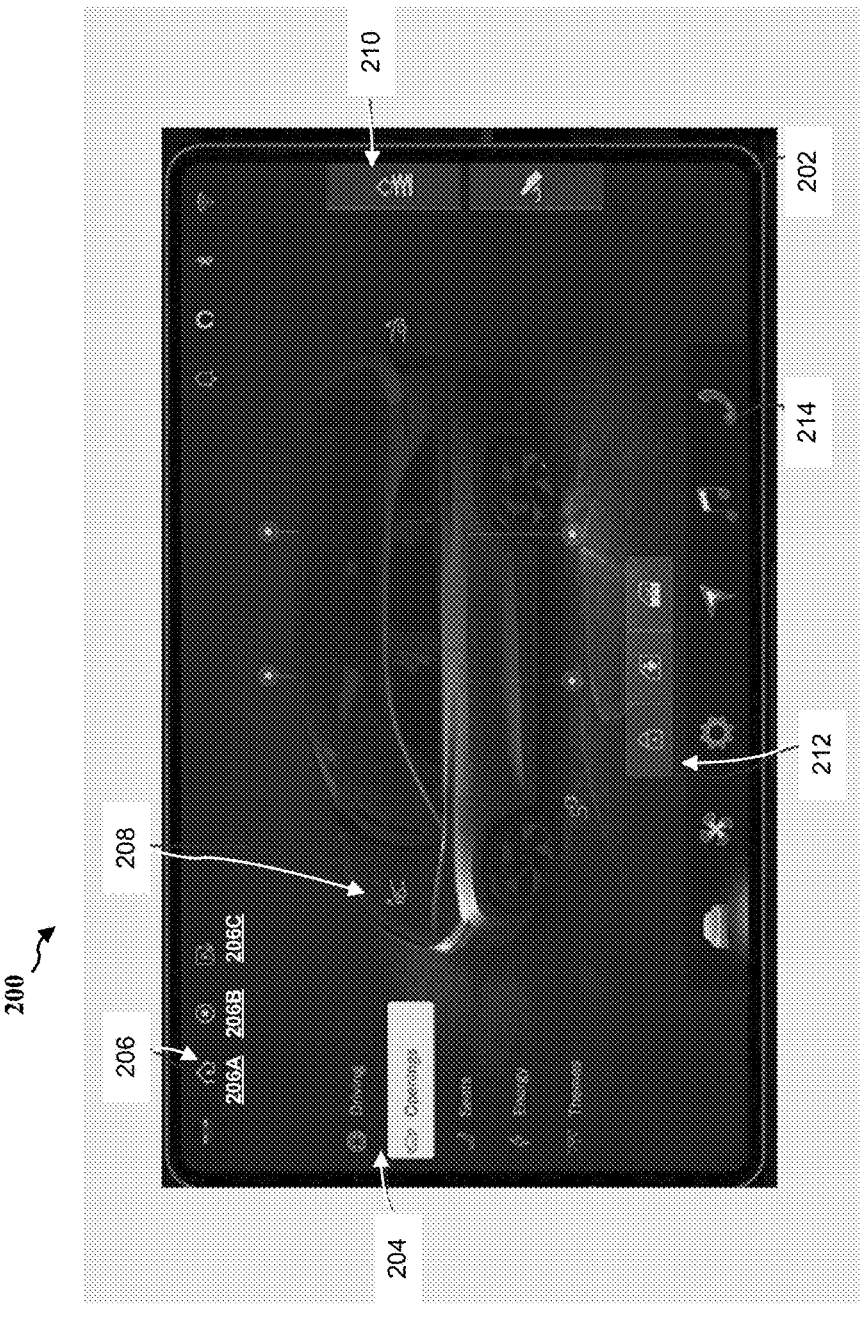
FIG. 2 illustrates an example of a screen and a screen view of a user interface thereupon, with a feature for user selection of vehicle openings, in accordance with some embodiments.

FIG. 2 illustrates an example 200 of a screen and a screen view of a user interface thereupon, with a feature for user selection of vehicle openings, in accordance with some embodiments. Referring to FIG. 2, in this view on the screen 202, there are GUI elements including openings GUI 204, shown highlighted to indicate the openings GUI 204 has been selected by using the gaze of the driver of the vehicle. The selected openings GUI 204 to can provide options for the driver of the vehicle to access automobile system functions such as, for example, to lock and unlock doors and trunk from inside the vehicle, to toggle child safety locks, to operate the rear window sunshade, to open and close the charge port door, etc. In some embodiments, the screen 202 also displays an upper menu bar with GUI elements 206 and/or indicators, such as home GUI 206A, record GUI 206B, parking selector 206C, Wi-Fi connection, signal strength, GUI 208 to open or unlatch the hood, a GUI 210 for suspension settings, a GUI group 212 that may be selected, e.g., for door locks, child safety lock, window lock operation, a phone GUI 214 for placing and receiving hands-free calls and accessing phone's contacts, messages, and recent call list, and further GUIs and/or indicators. In some embodiments, this view is a card seen in the user interface on the lower screen 333b (e.g., FIG. 3). In some embodiments, the various GUIs can be selected and through touchscreen and/or gaze determination. Selecting the GUI can cause a specific function to be activated by the selected GUI.

Figure 3:
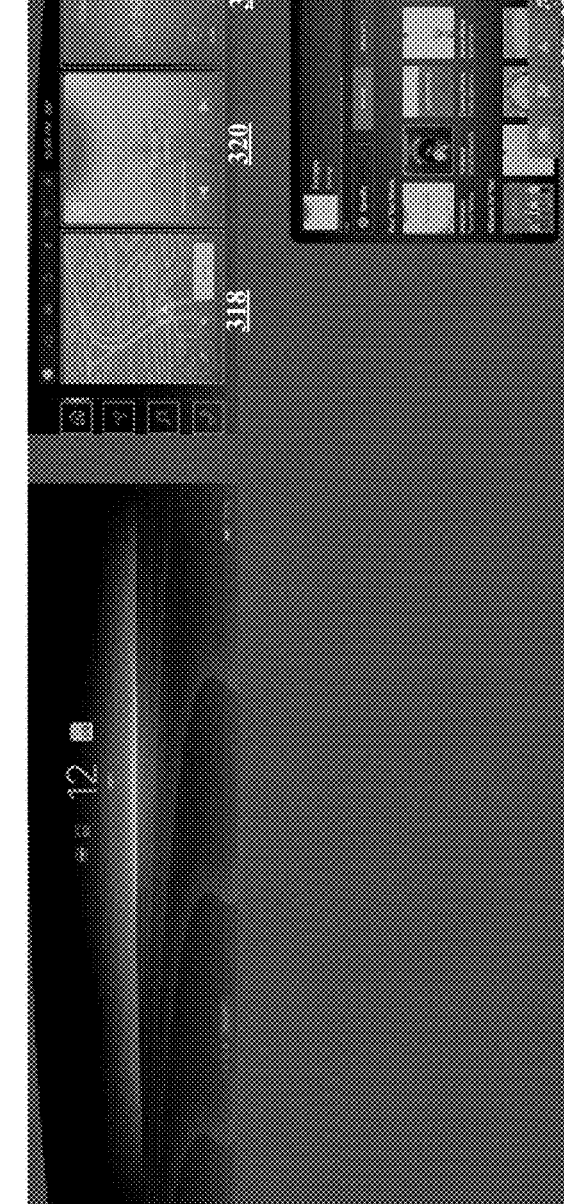
FIG. 3 illustrates an example of selectable graphical user interface (GUI) elements on the infotainment screen of the vehicle, in accordance with some embodiments.

FIG. 3 illustrates an example 300 of selectable GUI elements on the infotainment screen of the vehicle, in accordance with some embodiments. Referring to FIG. 3, a gaze processing module can continuously track the driver's eye gaze direction based on the gaze data to determine whether they are looking at the infotainment screen. Based on the driver's eye gaze, the gaze processing module can determine the driver is looking at a selectable GUI being displayed and can highlight the GUI being displayed on the upper screen 333a. For example, the upper screen 333a displays selectable GUI elements including a graphical representation of a navigation application 318, a graphical representation of a media application 320, and a graphical representation of a mobile phone application 322. The lower screen 333b displays selectable GUI elements including quick launch buttons (e.g., navigation application 330, media application 332, mobile phone application 334, and parking assistance application 336, etc.).

As an example, based on the gaze data, the gaze processing module can determine that the driver of the vehicle is looking at parking assistance application 336. In some embodiments, to provide feedback to the driver of the vehicle, the gaze processing module can highlight an edge of the selected GUI element (e.g., highlight surrounding parking assistance application 336 button) as a visual acknowledgement to the driver of the vehicle that their eye gaze is directed at the parking assistance application 336 button. In some other embodiments, the gaze processing module generates an audio as an audio acknowledgement to the driver of the vehicle. As an example, the gaze processing module recites the title of the GUI element (e.g., parking assistance application 336 button) to acknowledge the driver of the vehicle that their eye gaze is directed at the parking assistance application 336 button. Note that other feedback mechanisms can be utilized to provide acknowledgement to the driver that their eye gaze is on the selectable GUI element.

In some embodiments, in analyzing the captured eyelid movement of the driver, the gaze processing module can analyze the blinking pattern of the driver. The gaze processing module can compare the blinking pattern of the driver with one or more predefined blinking patterns. For example, the one or more predefined blinking patterns can include a single blink, a double blink, and a triple blink. A single blink can correspond to an action of selecting a GUI element while a double blink can correspond to an action of launching an application. Third blink can correspond to an action of exiting an application. Further blinking patterns could be defined in further embodiments.

Still referring to FIG. 3, the gaze processing module can analyze captured eyelid movement of the driver to determine whether the driver wants to launch parking assistance application 336. An example process for doing so is described in connection with FIG. 5. In some embodiments, the gaze processing module launches parking assistance application 336 upon detecting the blinking pattern of the driver is a double blink (will be described in connection with FIG. 4A). Further blinking patterns could be defined in further embodiments.

Figure 4A:
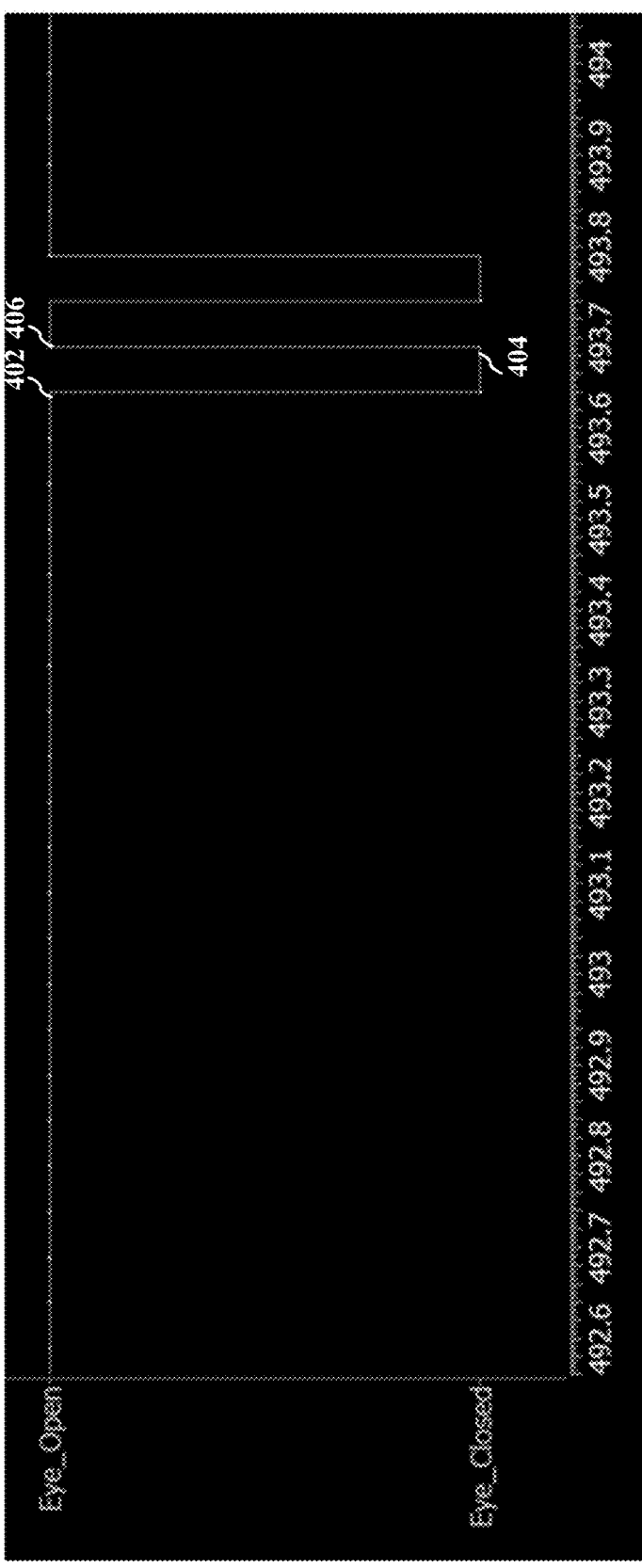
FIGS. 4A-4C are various examples of a predefined blinking pattern, in accordance with some embodiments.
Figures 4B, 4C:
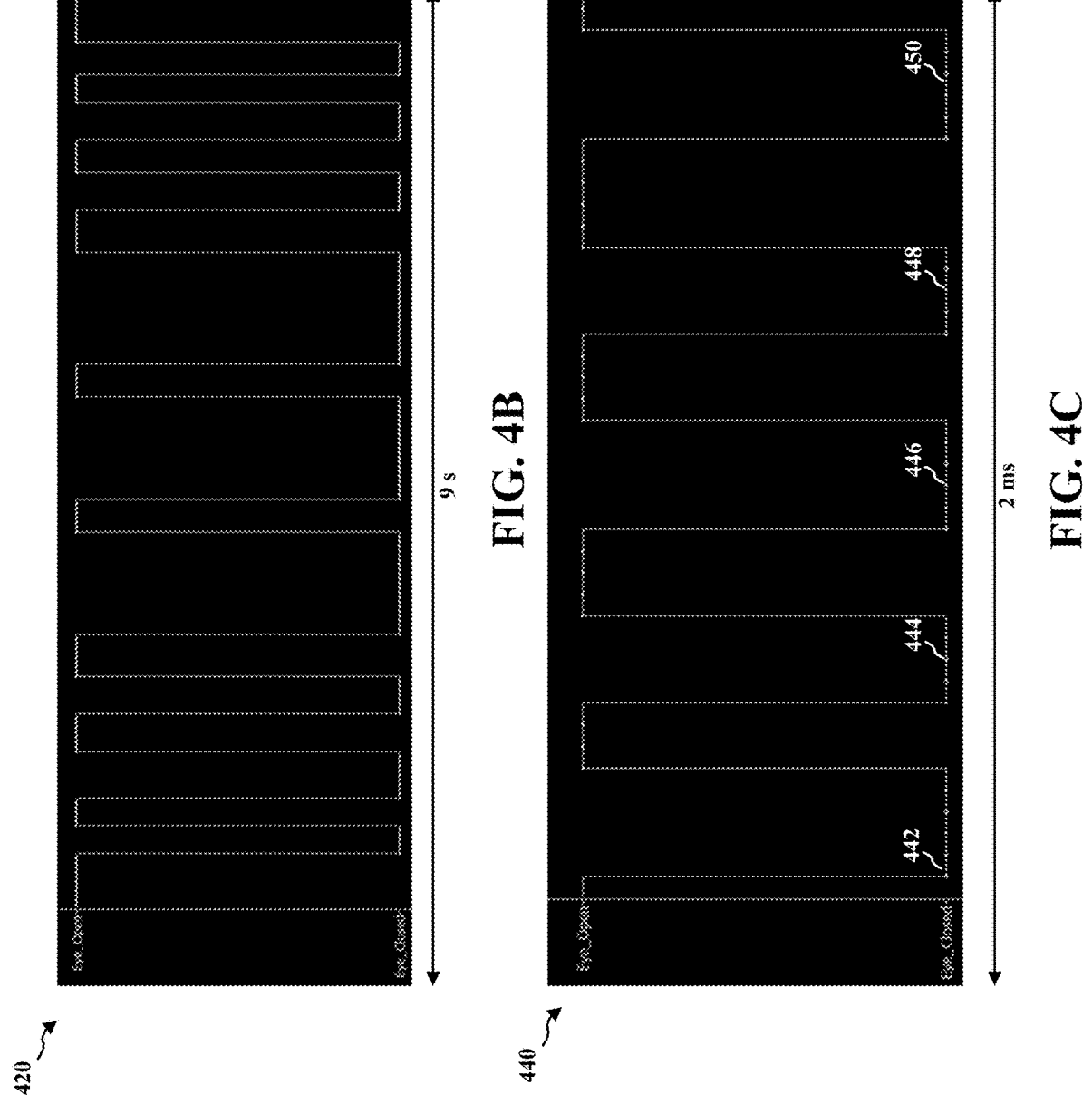

FIGS. 4A-4C are various examples of a predefined blinking pattern, in accordance with some embodiments. Referring to FIG. 4A, double blink can be defined as two consecutive transition cycles of one blink for a maximum of a predefined time period in millisecond (msec). Shown in FIG. 4A, the predefined time period is 50 msec. One blink can be measured from an instance of eye open 402, to eye closed 404, and to eye open 406. Other periods of time can be used (e.g., 40 msec, 60 msec, etc.)

FIG. 4B illustrates another example of a blinking pattern in accordance with some embodiments. In some embodiments, the blinking pattern is predefined. To predefine the blinking pattern, the driver can initiate a set up through the infotainment screens for various blinking patterns to perform an automobile system function. Referring to FIG. 4B, a blinking pattern 420 resembles a morse code of SOS pattern. FIG. 4C illustrates another example of a blinking pattern 440 in accordance with some embodiments. Referring to FIG. 4C, the blinking pattern includes five consecutive transition cycles (e.g., 442, 444, 446, 448, 450) of one blink within a 2 second time window this is predefined and when recognized by the gaze processing module cause the infotainment system to perform an automobile system function associated with the selected GUI element.

Figure 5:
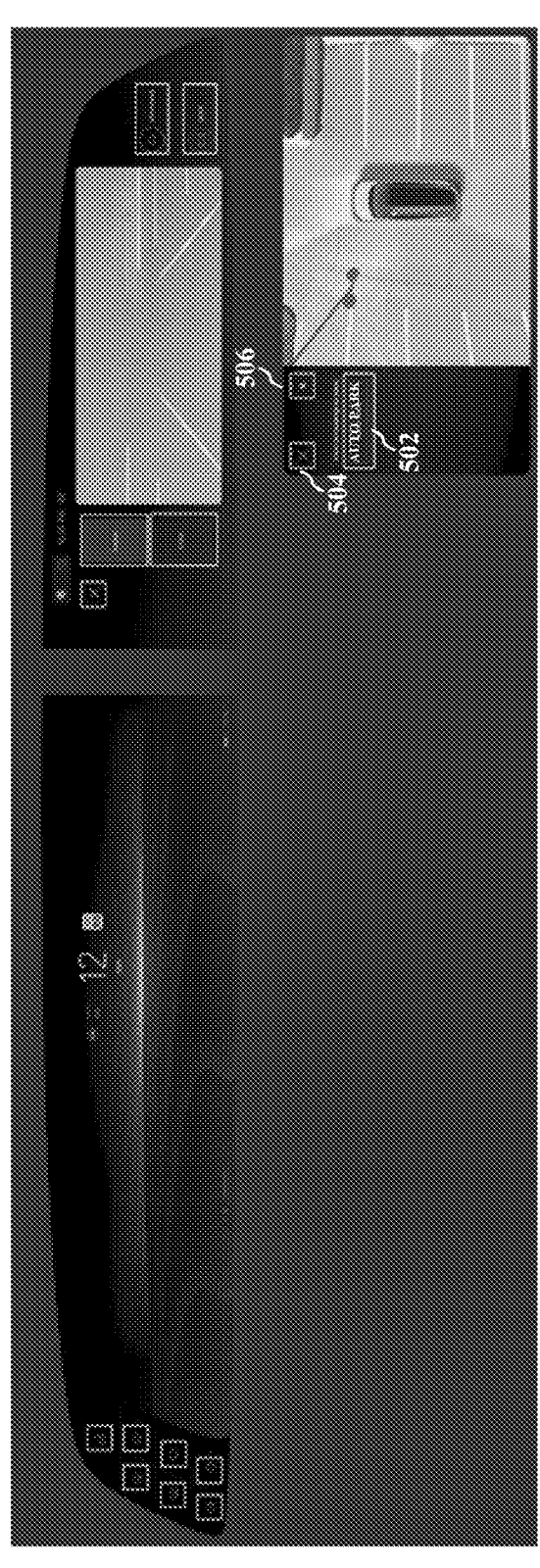
FIG. 5 is an example of gaze detection performs an automobile system function associated with GUI element parking assistance as previously described, in accordance with some embodiments.

FIG. 5 is an example 500 of gaze detection performing an automobile system function associated with GUI element parking assistance as previously described in accordance with some embodiments. Referring to FIG. 5, the driver can use their eye gaze to select an Auto Park GUI element 502, exit GUI element 504, or audio GUI element 506.

In some embodiments, a gaze processing module can adjust a brightness of a portion a screen according to the gaze data. For example, the gaze processing module can increase the brightness of the portion of screen when the driver directs their gaze at the screen. In another example, the gaze processing module can dim other portions of the screen that are not being looked at by the driver based on the driver's gaze.

Figure 6A:
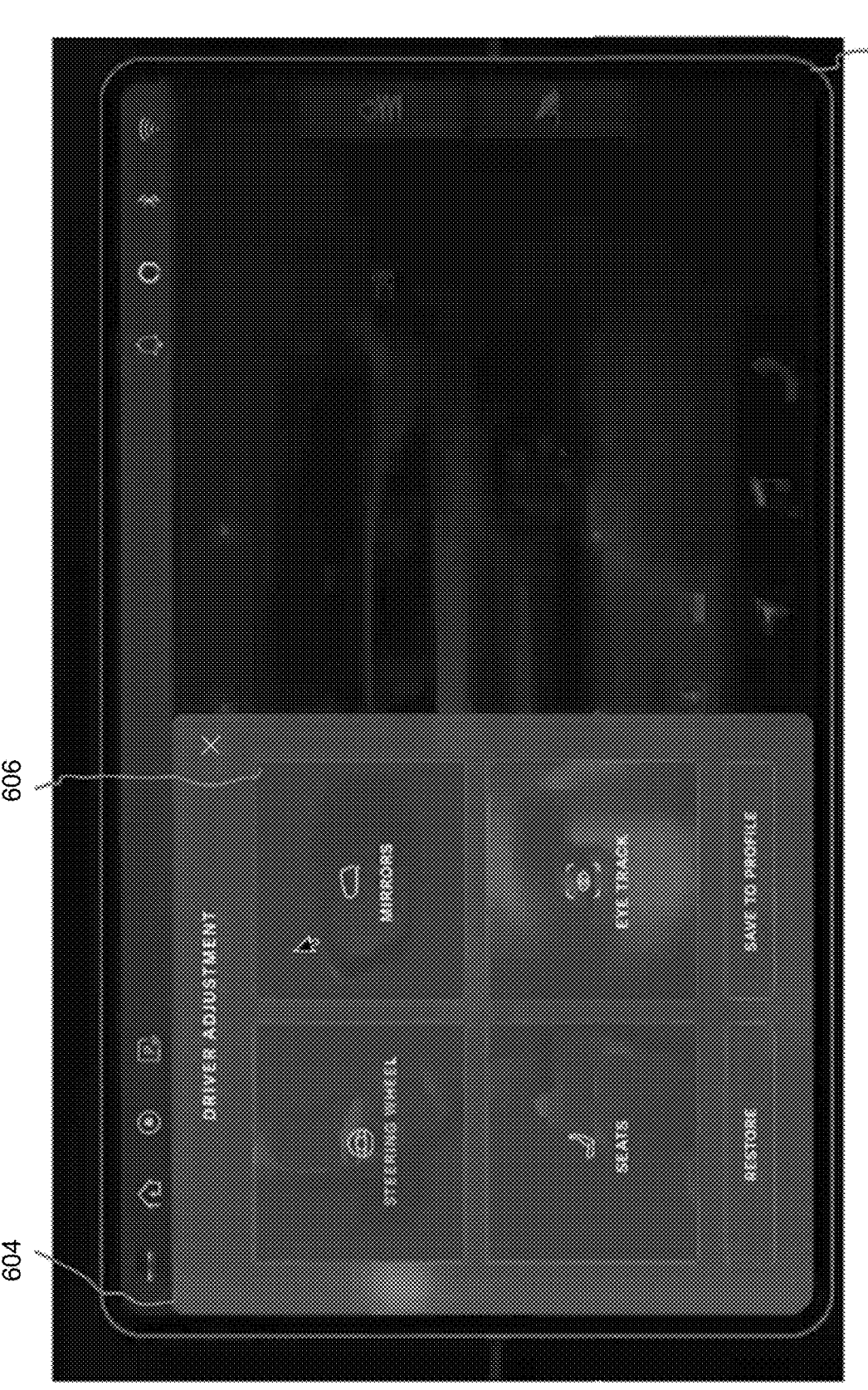
FIG. 6A depicts a screen with a user interface showing a driver adjustment selection group, in which mirrors can be selected, in accordance with some embodiments.
Figure 6B:
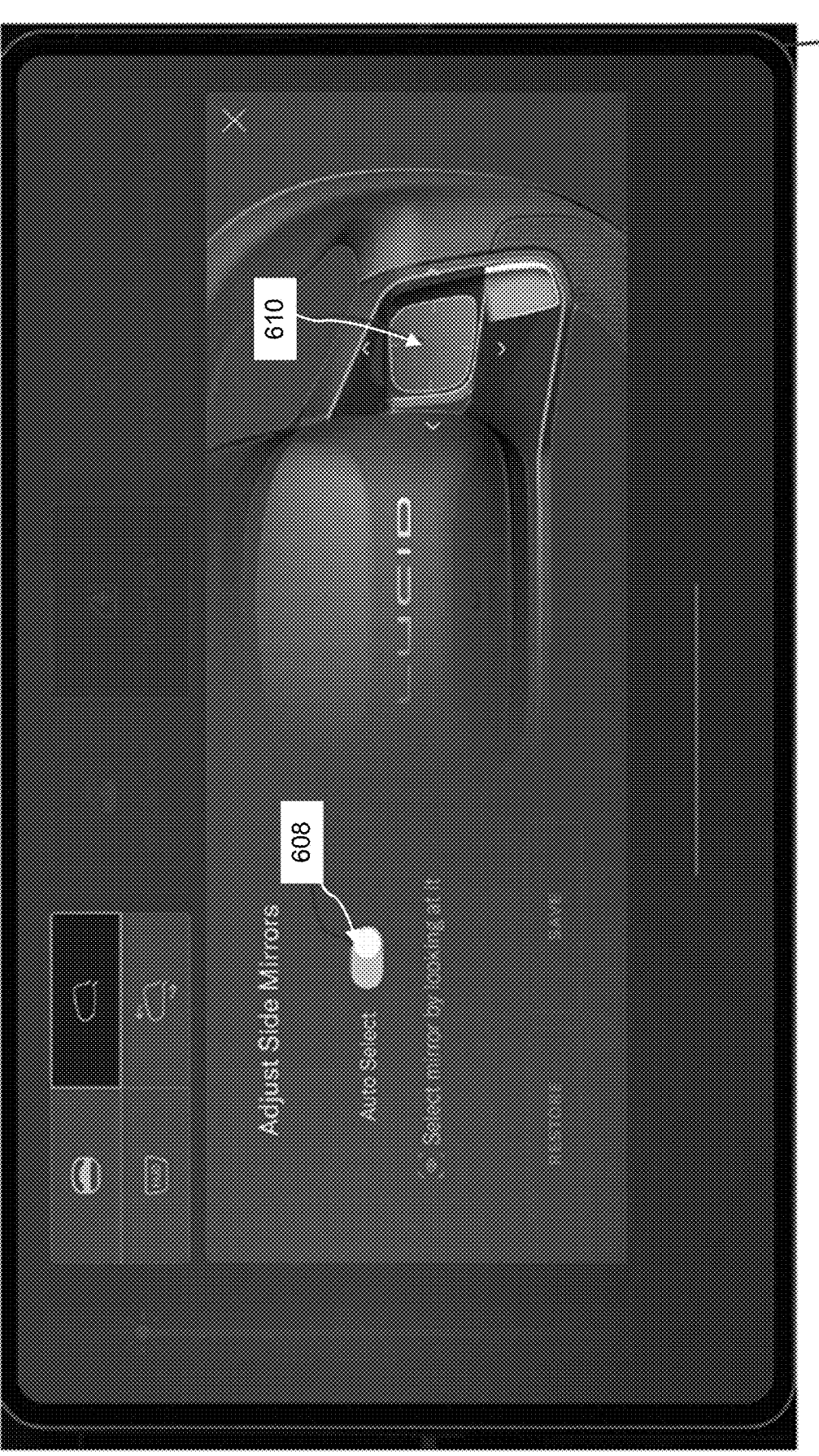
FIG. 6B depicts a screen with a user interface showing a selector for adjusting side mirrors, in which the mirrors can be auto selected through the driver looking at a mirror, as determined by a gaze detection system, in accordance with some embodiments.
Figure 6C:
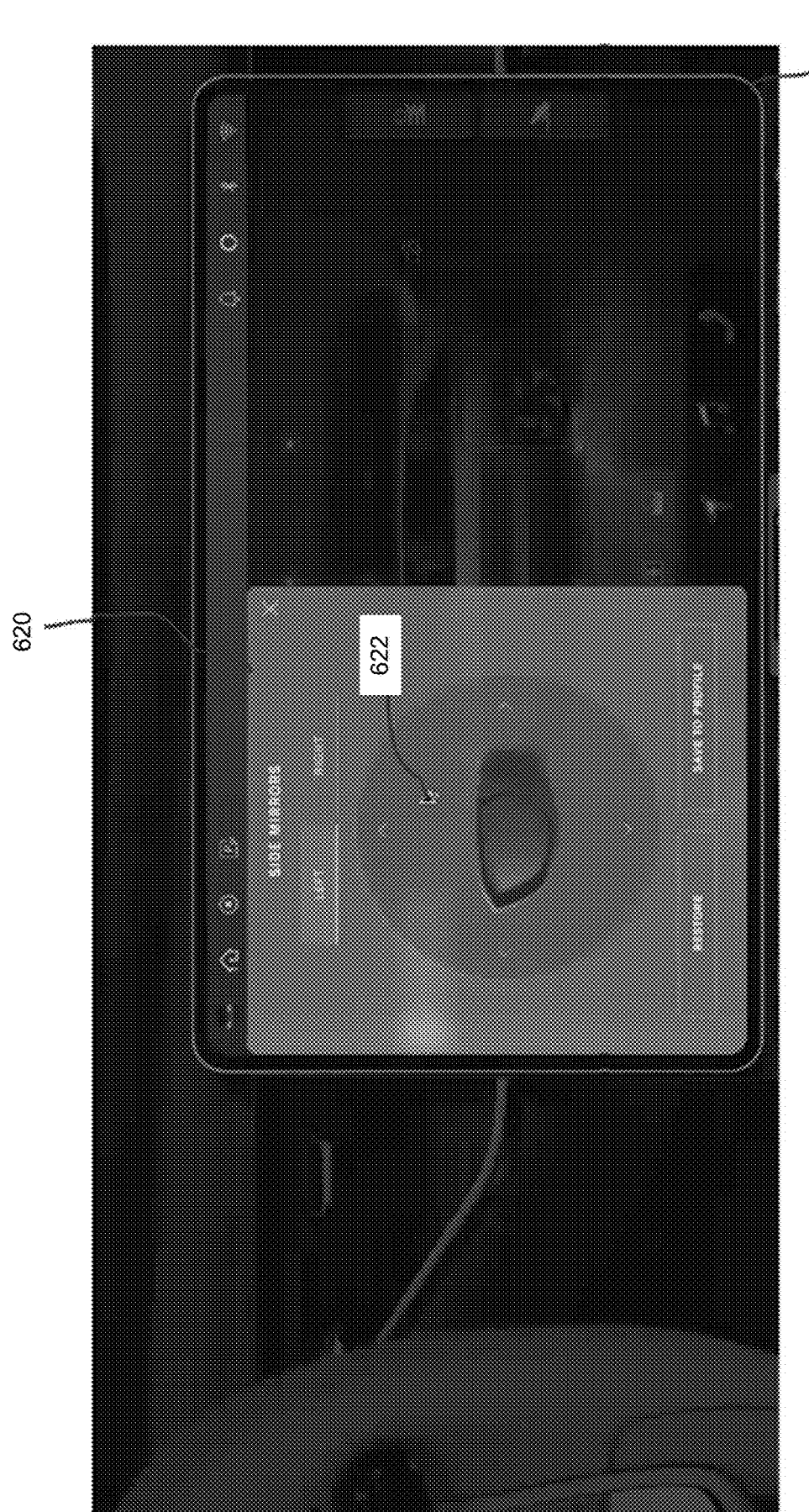
FIG. 6C depicts a screen with a user interface for adjusting a selected side mirror as may be operated through the driver looking at the screen as determined by a gaze detection system in, accordance with some embodiments.

FIGS. 6A-6C illustrate some embodiments of an automotive side mirror adjustment feature of a user interface, which can be implemented using a gaze detection system as described above. It should be appreciated that further embodiments could use a touchscreen, or a touchscreen combined with a gaze detection system, with some features activated by one, the other or by either. Still further, voice command could also be used.

FIG. 6A depicts some embodiments of a screen 602 with a user interface showing a driver adjustment selection group 604, in which mirrors can be selected. In one operating scenario, the driver gazes at the driver adjustment selection group 604, which the gaze detection system determines, and the user interface highlights third driver adjustment selection group 604 as shown in FIG. 6A. Next, the driver gazes at the mirrors selector 606, which the gaze detection system determines, and the user interface brings up the next screen (see FIG. 6B).

FIG. 6B depicts some embodiments of a screen 602 with a user interface showing a selector 608 for adjusting side mirrors, in which the mirrors may be auto selected through the driver looking at a mirror, as determined by a gaze detection system. For example, the selector 608 could be a soft button activated by touchscreen and/or by gaze detection, and the active mode allows the user to select a mirror by looking at that mirror, as indicated in text on the user interface. In this example, a touchpad 610 located on the right side of the steering wheel, is also depicted in the user interface on the screen 602. Continuing, in one operating scenario, the driver gazes at the left side mirror, or gazes at the right side mirror, and the gaze detection system determines this action for example by monitoring dwell time for driver gaze in a specified angular range. The system interprets the determination of driver gaze at a specific mirror as fulfilling the instruction and selecting a specific mirror by looking at it. From here, the driver can use the touchpad 610 to adjust the selected mirror (e.g., left, right, up, down). In a further scenario and embodiment, the driver can adjust the selected mirror by gazing in a specified direction, e.g., left, right, up, down, which is detected by the gaze detection system and communicated through the user interface to the specified vehicle component or system, i.e., the selected mirror. In one embodiment, the system detects driver gaze at a specific mirror, and brings up the next screen (see FIG. 6C).

FIG. 6C depicts some embodiments of a screen 602 with a user interface for adjusting a selected side mirror, as may be operated through the driver looking at the screen as determined by a gaze detection system. In one operating scenario, the driver gazes at a location in a side mirrors card 620 displayed in the user interface on the screen 602. The gaze detection system determines gaze direction and positions a cursor 622 on the screen 602 accordingly. If the user gazes for a specified dwell time at a specific direction adjustment selector (e.g., up arrow, down arrow, left arrow, right arrow) on the side mirrors card 620, the system detects this, and adjusts the mirror accordingly.

FIG. 7 is a data flow diagram of some embodiments of a method for selecting and implementing an automobile system function selectable by an eye gaze of a driver of a vehicle in accordance with some embodiments. The method may be performed by processing logic that may comprise hardware (e.g., circuitry, dedicated logic, programmable logic, a processor, a processing device, a CPU, a system-on-chip, etc.), software (e.g., instructions running/executing on a processing device), firmware (e.g., microcode), or a combination thereof. In some embodiments, at least a portion of the method may be performed based on aspects of FIGS. 1A-6C.

With reference to FIG. 7, the method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

The method begins at block 702, where processing logic can receive, via gaze sensors, gaze data indicative of the eye gaze of the driver of the vehicle. In some embodiments, the gaze sensors can include a first camera and a second camera. For example, referring to FIG. 1A, a gaze processing module can receive gaze data via a gaze sensor such as DMC 102 and DOMC 104, as described above.

As also shown in FIG. 7, at block 704, processing logic can determine, based on the gaze data, that the driver of the vehicle is looking at a selectable GUI element. For example, referring to FIG. 3, after receiving the gaze data, a gaze processing module can determine that the driver of the vehicle is looking at parking assistance application 336, as described above.

As further shown in FIG. 7, at block 706, processing logic can capture eyelid movement of the driver. For example, referring to FIGS. 1C and 5, the gaze processing module can capture eyelid movement of the driver using DMC 102 for determination of gaze of a driver. This determination can determine whether the driver wants to perform a function such as parking assistance application, as described above.

As additionally shown in FIG. 7, at block 708, processing logic can analyze captured eyelid movement to determine whether to perform an automobile system function associated with the GUI element. In some embodiments, processing logic can analyze a blinking pattern of the driver, and compare the blinking pattern of the driver with one or more predefined blinking patterns. In some embodiments, processing logic can store the predefined blinking pattern of the driver of the vehicle for use in comparing with the captured eyelid movement, wherein the predefined blinking pattern includes at least one blink. In some embodiments, processing logic can highlight a GUI element at which the driver last gazed. In some embodiments, processing logic can analyze the gaze data using an ML model.

As furthermore shown in FIG. 7, at block 710, processing logic can perform the automobile system function associated with the GUI element upon determining that analysis of the captured eyelid movement indicates the automobile system function is to be performed. For example, processing logic can perform an automobile system function such as turning on the HVAC system, changing the windshield wiper speed, enabling the seat massage, activating surround view cameras, playing drivers' desired song, or performing navigation to a destination, without the need to touch the screen, or use the voice command. Other automotive functions can be selected and activated based on a driver's blinking pattern. In some embodiments, processing logic can update a display of a graphical representation of an application. For example, after a gaze processing module selects a GUI element, the gaze processing module displays the driver with other graphical representation that are not selected so the driver has the option to further select a different GUI element or graphical representation.

In some embodiments, processing logic can signal feedback to the driver of the vehicle to provide acknowledgement to the driver that their eye gaze is on the selectable GUI element. In some embodiments, to signal feedback to the driver of the vehicle, processing logic can highlight an edge of the selected GUI element (e.g., highlight surrounding parking assistance application button) as a visual acknowledgement to the driver of the vehicle that their eye gaze is directed at the parking assistance application button. In some other embodiments, processing logic can generate an audio as an audio acknowledgement to the driver of the vehicle.

In some embodiments, processing logic can adjust a brightness of a portion a screen according to the gaze data. As described above, the gaze processing module, for example, increases the brightness of the portion of screen when the driver directs their gaze at the screen.

Although FIG. 7 shows example blocks of data flow diagram 700, in some implementations, data flow diagram 700 may include additional blocks, fewer blocks, different blocks, or differently arranged blocks than those depicted in FIG. 7. Additionally, or alternatively, two or more of the blocks of data flow diagram 700 may be performed in parallel.

Figure 8:
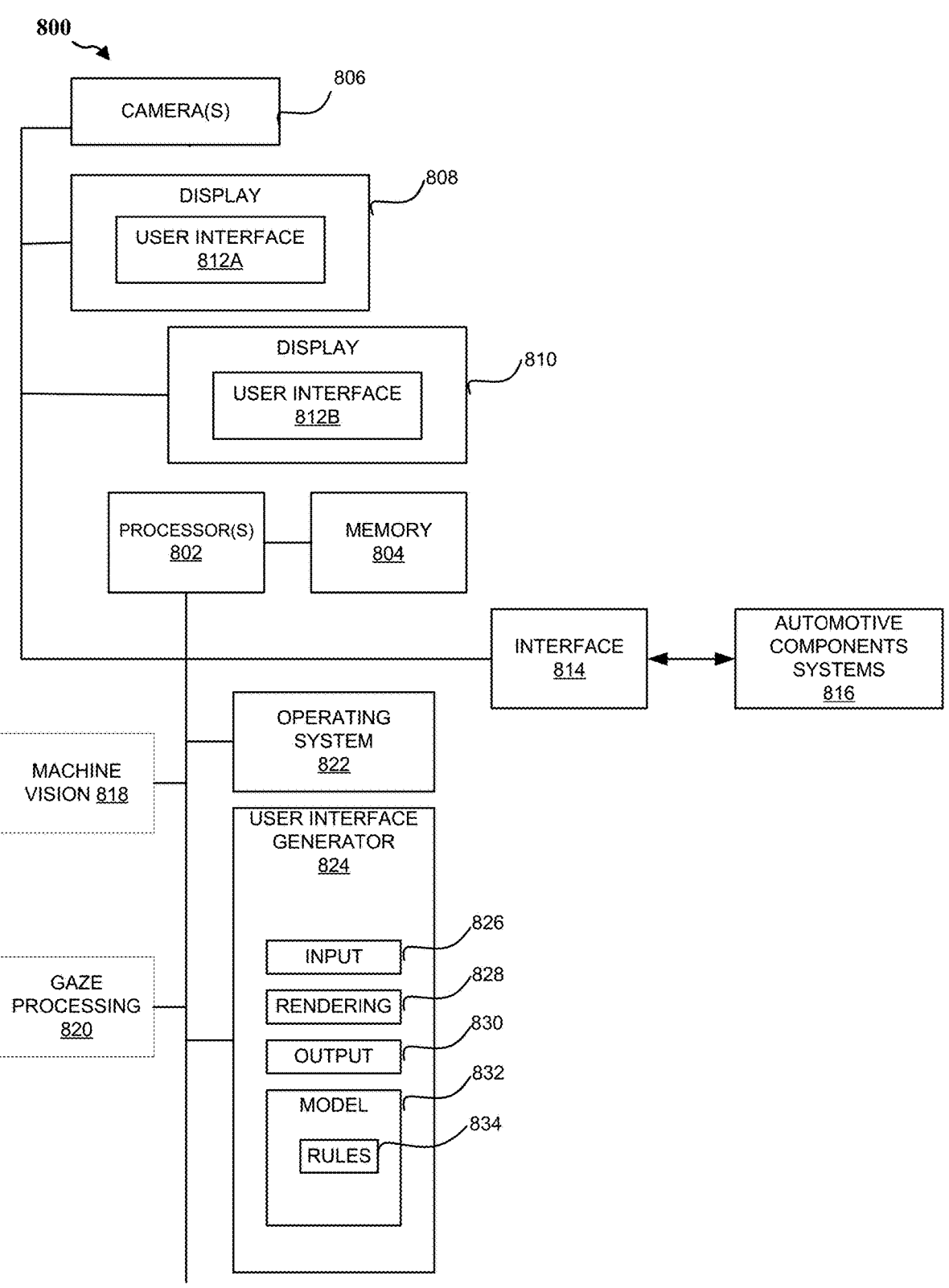
FIG. 8 is a block diagram illustrating some embodiments of a gaze detection system, in accordance with some embodiments.

FIG. 8 is a block diagram 800 illustrating some embodiments of a gaze detection system in accordance with some embodiments. One or more processors 802 coupled to memory 804 perform processing duties according to various software, hardware, firmware, or combination modules. The processor(s) 802 and memory 804 are coupled to one or more cameras 806, a first display 808 (e.g., having a display screen) on which a user interface 812A is displayed, a second display 810 on which a user interface 812B is displayed, and an interface 814 that is or can be coupled to automotive components and systems 816 in order to control, adjust or otherwise provide input to such components and systems. Also, the processor(s) 802 and memory 804 are coupled to an operating system 822, a machine vision module 818, a gaze processing module 820, and a user interface generator 824. The user interface generator 824 has an input module 826, a rendering module 828, and output module 830, and in some embodiments includes a model 832 with rules 834. Other forms of models may be used in some embodiments. One form of implementation is special programming of the system, more specifically special programming of the processor(s) 802. It should be appreciated that structure of the various modules is determined by their functionality, in some embodiments.

In an operating scenario, which describes functionality of some embodiments, a driver or occupant of a vehicle is imaged by the camera(s) 806, while the driver views one, the other, or neither display 808, 810. Using the machine vision module 818, the system processes the imaging, and using the gaze processing module 820, the system determines what the driver is gazing at. The determined gaze information is passed along through the input module 826 of the user interface generator 824, along with other input (e.g., touchscreen, touchpad, conventional control, etc., in some embodiments). The user interface generator 824 determines to change the display of the user interface 812A based on the determined gaze or other input information, interpreted as user input. With such changes to the user interface 812A based on the model 832 and rules 834 thereof, the system passes appropriate information to the rendering module 828 to generate display information for the updated user interface. In some embodiments, the model 832 includes a dual screen interaction model. In some embodiments, the model 832 includes a hide/reveal feature or a digital detox feature. This display information is output through the output module 830 of the user interface generator 824, to one, the other or both displays 808, 810, which then display the updated user interface, e.g., user interface 812A on one display 808 and/or user interface 812B on another display 810. In some embodiments, these displays 808, 810 are an upper display screen and a lower display screen in an automobile or other vehicle. All of the above is coordinated through the operating system 822, which may be a real-time operating system. Further, the operating system 822 may receive from output module 830 from the user interface generator 824, and communicate user commands (from the user interface) through the interface 814 to automotive components and systems 816, for example to operate or provide input to such components and systems (e.g., audio/media system (which may be integrated), vehicle charging, seat adjustment, mirror adjustment, suspension settings, heating, ventilation and air conditioning operation, windows, door lock settings, etc.) It should be appreciated that machine vision could be integrated with or part of gaze processing, and vice versa, in some embodiments. It should be appreciated that the user interface generator 824 may be integrated with or part of the operating system 822, in some embodiments.

Figure 9:
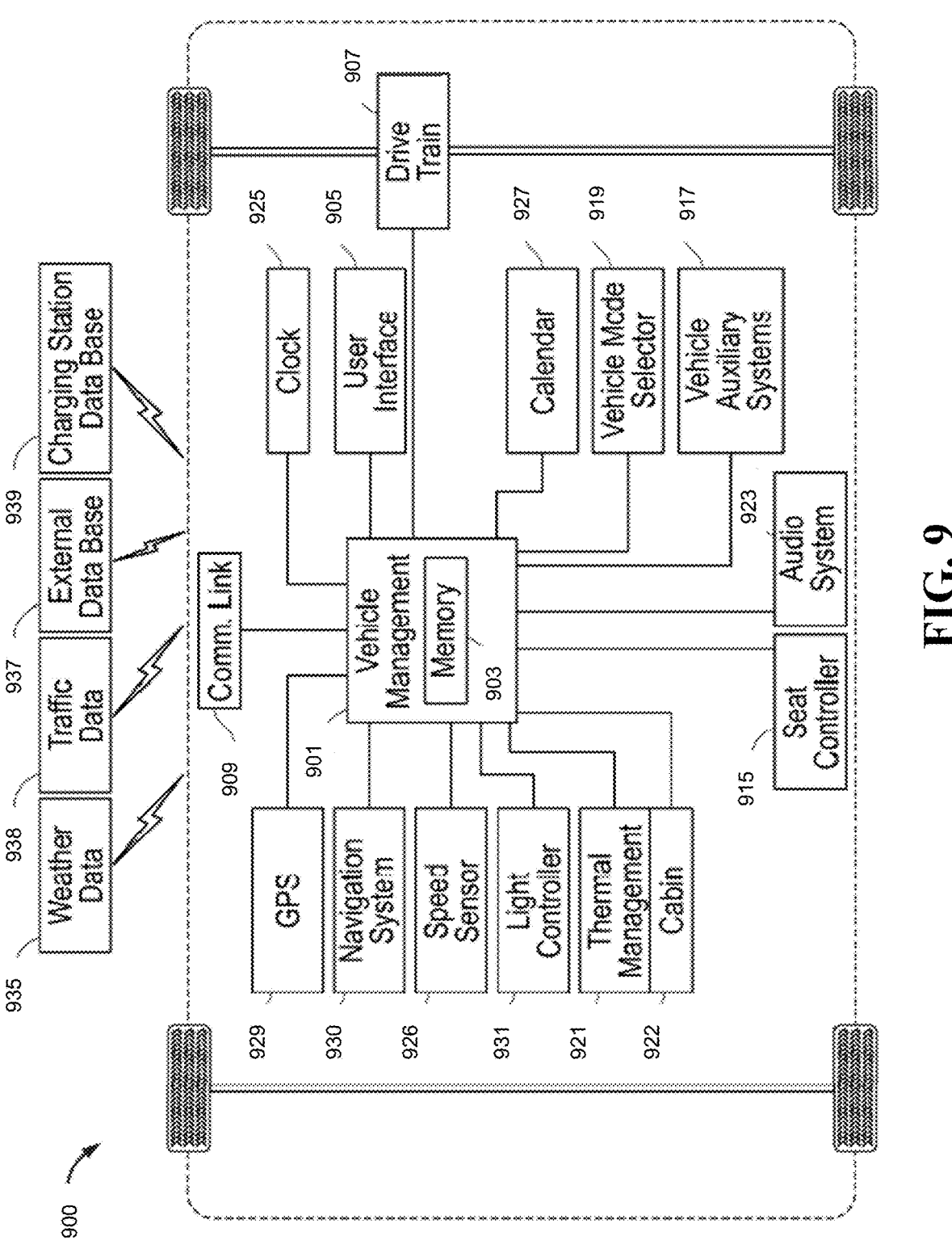
FIG. 9 illustrates system level diagram of a vehicle, in accordance with some embodiments.

FIG. 9 is a high-level view of some embodiments of a vehicle 900. Vehicle 900 can be an electric vehicle (EV), a vehicle utilizing an internal combustion engine (ICE), or a hybrid vehicle, where a hybrid vehicle utilizes multiple sources of propulsion including an electric drive system. Vehicle 900 includes vehicle management 901 also referred to herein as a vehicle on-board system controller 901, which is comprised of a processor (e.g., a central processing unit (CPU)). The vehicle on-board system controller 901 also includes memory 903, with memory 903 being comprised of EPROM, EEPROM, flash memory, RAM, solid state drive, hard disk drive, or any other type of memory or combination of memory types. It should be understood that the terms "vehicle management system," "system controller" and "vehicle on-board system controller" can be used interchangeably throughout this disclosure. A user interface 905 is coupled to the vehicle on-board system controller 901. Interface 905 allows the driver, or a passenger, to interact with the vehicle management system, for example inputting data into the navigation system 930, altering the heating, ventilation and air conditioning (HVAC) system via the thermal management system 921, controlling the vehicle's entertainment system (e.g., radio, CD/DVD player, etc.), adjusting vehicle settings (e.g., seat positions, light controls, etc.), and/or otherwise altering the functionality of vehicle 900. In at least some embodiments, user interface 905 also includes means for the vehicle management system to provide information to the driver and/or passenger, information such as a navigation map or driving instructions (e.g., via the navigation system 930 and GPS system 929) as well as the operating performance of any of a variety of vehicle systems (e.g., battery pack charge level for an EV, fuel level for an ICE-based or hybrid vehicle, selected gear, current entertainment system settings such as volume level and selected track information, external light settings, current vehicle speed (e.g., via speed sensor 926), current HVAC settings such as cabin temperature and/or fan settings, etc.) via the thermal management system 921. Interface 905 may also be used to warn the driver of a vehicle condition (e.g., low battery charge level or low fuel level) and/or communicate an operating system malfunction (battery system not charging properly, low oil pressure for an ICE-based vehicle, low tire air pressure, etc.). Vehicle 900 can also include other features like an internal clock 925 and a calendar 927.

In some embodiments, user interface 905 includes one or more interfaces including, for example, a front dashboard display (e.g., a cockpit display, etc.), a touchscreen display (e.g., a pilot panel, etc.), as well as a combination of various other user interfaces such as push-button switches, capacitive controls, capacitive switches, slide or toggle switches, gauges, display screens, warning lights, audible warning signals, etc. It should be appreciated that if user interface 905 includes a graphical display, the vehicle on-board system controller 901 may also include a graphical processing unit (GPU), with the GPU being either separate from or contained on the same chip set as the processor.

Vehicle 900 also includes a drive train 907 that can include an internal combustion engine, one or more motors, or a combination of both. The vehicle's drive system can be mechanically coupled to the front axle/wheels, the rear axle/wheels, or both, and may utilize any of a variety of transmission types (e.g., single speed, multi-speed) and differential types (e.g., open, locked, limited slip).

Drivers often alter various vehicle settings, either when they first enter the car or while driving, in order to vary the car to match their physical characteristics, their driving style and/or their environmental preferences. The vehicle on-board system controller 901 monitors various vehicle functions that the driver may use to enhance the fit of the car to their own physical characteristics, such as seat position (e.g., seat position, seat height, seatback incline, lumbar support, seat cushion angle and seat cushion length) using seat controller 915 and steering wheel position using an auxiliary vehicle system controller 917. In some embodiments, the vehicle on-board system controller 901 also can monitor a driving mode selector 919 which is used to control performance characteristics of the vehicle (e.g., economy, sport, normal). In some embodiments, the vehicle on-board system controller 901 can also monitor suspension characteristics using auxiliary vehicle system controller 917, assuming that the suspension is user adjustable. In some embodiments, the vehicle on-board system controller 901 also monitors those aspects of the vehicle which are often varied by the user in order to match his or her environmental preferences for the cabin 922, for example setting the thermostat temperature or the recirculation controls of the thermal management system 921 that uses an HVAC controller, and/or setting the radio station/volume level of the audio system using controller 923, and/or setting the lights, either internal lighting or external lighting, using light controller 931. Also, besides using user-input and on-board sensors, the vehicle on-board system controller 901 can also use data received from an external on-line source that is coupled to the controller via communication link 909 (using, for example, GSM, EDGE, UMTS, CDMA, DECT, WiFi, WiMax, etc.). For example, in some embodiments, the vehicle on-board system controller 901 can receive weather information using an on-line weather service 935 or an on-line data base 937, traffic data 938 for traffic conditions for the navigation system 930, charging station locations from a charging station database 939, etc.

As an example, upon turning on the vehicle 900, in some embodiments, the vehicle on-board system controller 901 identifies the current driver (and go to their last pre-set functions) or just go the last pre-set functions for the vehicle (independent of who the current driver is), related to such features as: media functions, climate functions—heating, ventilation and air conditioning (HVAC) system, driving functions, seat positioning, steering wheel positioning, light control (e.g., internal lighting, external lighting, etc.), navigation functions, etc. Note that for purposes herein, the techniques will be described with reference to capacitive controllers. Even so, the techniques are not limited to the capacitive controllers and can be employed with other types of controllers.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent, or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer, or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In some embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for selecting and implementing an automobile system function selectable by an eye gaze of a driver of a vehicle, comprising:

in response to determining a GUI element was previously gazed upon, highlighting the GUI element to remind the driver of the vehicle the GUI element was previously gazed upon;

receiving, via gaze sensors, gaze data indicative of the eye gaze of the driver of the vehicle;

determining, based on the gaze data, that the driver of the vehicle is gazing upon a selected graphical user interface element (GUI);

capturing eyelid movement of the driver;

analyzing captured eyelid movement to determine whether to perform an automobile system function associated with the selected GUI element; and performing the automobile system function associated with the selected GUI element upon determining that analysis of the captured eyelid movement indicates the automobile system function is to be performed.

2. The method of claim 1, wherein the analyzing the captured eyelid movement to determine whether to perform the automobile system function associated with the selected GUI element comprises:

analyzing a blinking pattern of the driver; and comparing the blinking pattern of the driver with one or more predefined blinking patterns.

3. The method of claim 2, further comprising:

storing the predefined blinking pattern of the driver of the vehicle for use in comparing with the captured eyelid movement, wherein the predefined blinking pattern includes at least one blink.

4. The method of claim 1 further comprising:

signaling feedback to the driver of the vehicle to provide acknowledgement to the driver that their eye gaze is on the selectable GUI element.

5. The method of claim 4, wherein the signaling feedback to the driver of the vehicle comprises at least one of:

highlighting an edge of the selected GUI element as a visual acknowledgement to the driver of the vehicle; or generating an audio as an audio acknowledgement to the driver of the vehicle.

6. The method of claim 1, further comprising:

adjusting a brightness of a portion a screen according to the gaze data.

7. The method of claim 1, wherein the performing the automobile system function associated with the selected GUI element comprises:

updating a display of a graphical representation of an application.

8. The method of claim 1, wherein the gaze sensors comprise a first camera and a second camera.

9. The method of claim 1, wherein the analyzing the captured eyelid movement to determine whether to perform the automobile system function associated with the selected GUI element comprises:

analyzing the gaze data using a machine learning model.

10. A system for selecting and implementing an automobile system function selectable by an eye gaze of a driver of a vehicle, comprising: one or more processors configured to:

in response to determining a GUI element was previously gazed upon, highlight the GUI element to remind the driver of the vehicle the GUI element was previously gazed upon;

receive, via gaze sensors, gaze data indicative of the eye gaze of the driver of the vehicle;

determine, based on the gaze data, that the driver of the vehicle is gazing upon a selected graphical user interface element (GUI);

capture eyelid movement of the driver;

analyze captured eyelid movement to determine whether to perform an automobile system function associated with the selected GUI element; and perform the automobile system function associated with the selected GUI element upon determining that analysis of the captured eyelid movement indicates the automobile system function is to be performed.

11. The system of claim 10, wherein the analyzing the captured eyelid movement to determine whether to perform the automobile system function associated with the GUI element comprises:

analyzing a blinking pattern of the driver; and comparing the blinking pattern of the driver with one or more predefined blinking patterns.

12. The system of claim 11, further comprising:

storing the predefined blinking pattern of the driver of the vehicle for use in comparing with the captured eyelid movement, wherein the predefined blinking pattern includes at least one blink.

13. The system of claim 10, further comprising:

signaling feedback to the driver of the vehicle to provide acknowledgement to the driver that their eye gaze is on the selected GUI element.

14. The system of claim 13, wherein the signaling feedback to the driver of the vehicle comprises at least one of:

highlighting an edge of the selected GUI element as a visual acknowledgement to the driver of the vehicle; or generating an audio as an audio acknowledgement to the driver of the vehicle.

15. The system of claim 10, further comprising:

adjusting a brightness of a portion a screen according to the gaze data.

16. The system of claim 10, wherein the performing the automobile system function associated with the selected GUI element comprises:

updating a display of a graphical representation of an application.

17. The system of claim 10, wherein the gaze sensors comprise a first camera and a second camera.

18. A non-transitory computer-readable medium storing a set of instructions for selecting and implementing an automobile system function selectable by an eye gaze of a driver of a vehicle comprising:

one or more instructions that, when executed by one or more processors of a device, cause the device to:

in response to determining a GUI element was previously gazed upon, highlight the GUI element to remind the driver of the vehicle the GUI element was previously gazed upon;

receive, via gaze sensors, gaze data indicative of the eye gaze of the driver of the vehicle;

determine, based on the gaze data, that the driver of the vehicle is gazing upon a selected graphical user interface element (GUI);

capture eyelid movement of the driver;

analyze captured eyelid movement to determine whether to perform an automobile system function associated with the selected GUI element; and perform the automobile system function associated with the selected GUI element upon determining that analysis of the captured eyelid movement indicates the automobile system function is to be performed.

* * * * *